UNITED STATES PATENT OFFICE.

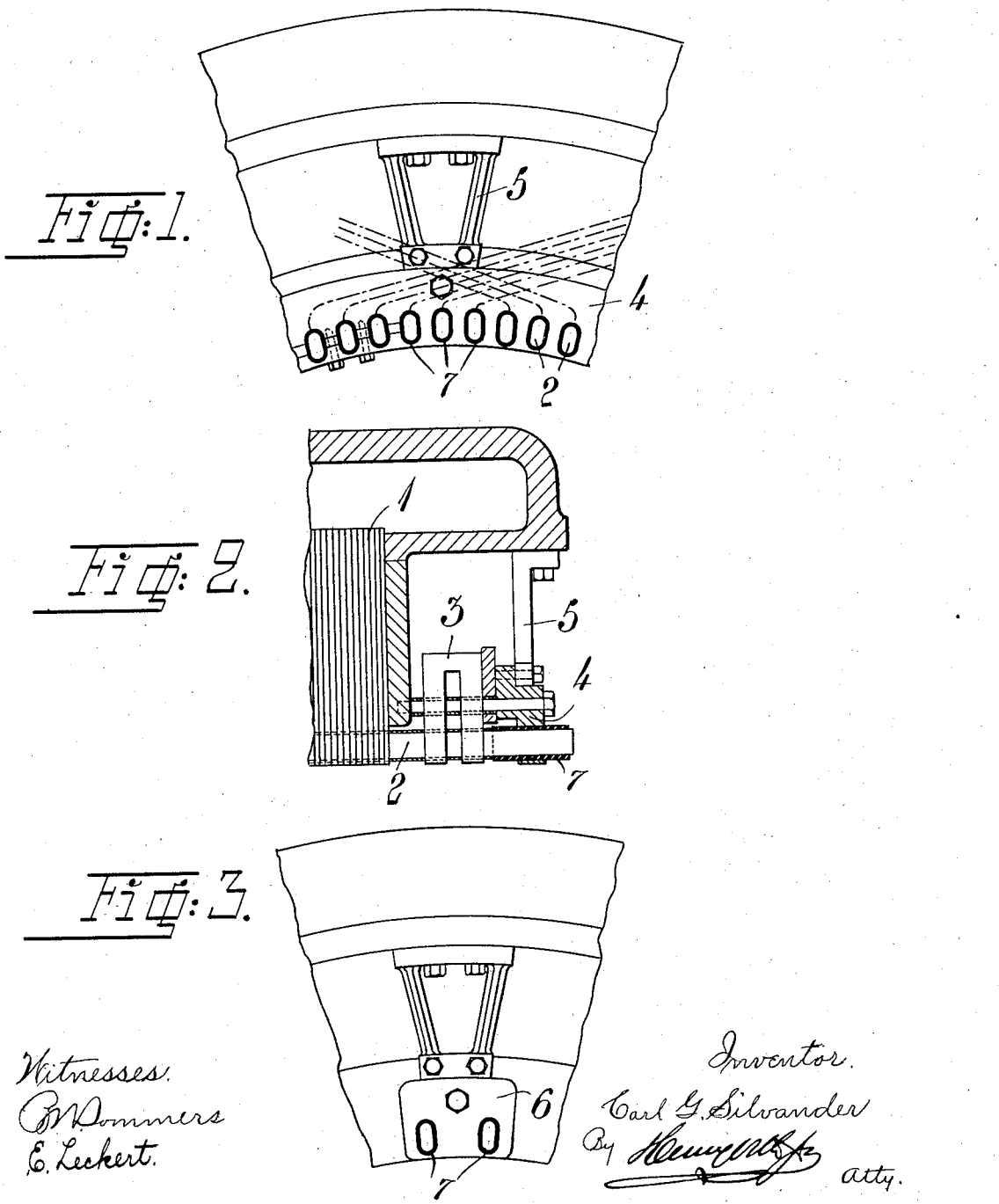

CARL G. SILVANDER, OF VESTERÅS, SWEDEN.

ELECTRIC-ALTERNATING-CURRENT MACHINE.

1,178,271.      Specification of Letters Patent.      Patented Apr. 4, 1916.

Application filed March 27, 1913. Serial No. 757,251.

*To all whom it may concern:*

Be it known that I, CARL G. SILVANDER, a citizen of the Kingdom of Sweden, residing at Vesterås, Sweden, have invented new and useful Improvements in Electric-Alternating-Current Machines, of which the following is a specification.

This invention relates to electric alternating current machines having a main bar winding disposed in slots of the stator core.

The object of the present invention is to provide for a mechanical strengthening of the winding so that the latter will be capable of withstanding the great stresses which arise especially in large alternating current machines.

It has already been proposed to use so called winding supports in combination with the stator winding of alternating current machines which supports are connected to the free parts of the windings or the end connectors which connect the active conductors of the winding.

According to the present invention a staying up of the bar winding is obtained in such manner that the winding bars (all or a part of them) are extended outside the point where they are connected with the end connectors and at the extended ends provided with stays or supports which may be carried out as a ring or as segments or as local supports and either as stays between the bars or as stays for the winding, in which latter case the stays or supports are connected to a fixed part of the machine such as for instance the frame, end covers or the bed plate of the machine.

In the accompanying drawing two embodiments of this invention are shown.

Figure 1 is an end view and Fig. 2 a partial section of a part of a stator core having bar winding supports according to this invention. Fig. 3 is an end view of a modification of the bar support.

Referring to Figs. 1 and 2 of the drawing, 1 is the active iron of a stator core for an alternating current machine having a bar winding, and 2 indicates winding bars. In the embodiment shown there is only one bar per slot of the stator core but the invention is evidently not restricted thereto. The ends of the bars which project outside the active iron are in usual manner connected to each other by means of end connectors 3 (Fig. 2). For the purpose of staying up the winding the bars 2 are according to this invention extended outside the points where they are connected to the end connectors and rigidly mounted in a support. According to Figs. 1 and 2 said support consists of a ring 4, which may be provided with holes, slots, clips or the like, in which the ends of the winding bars are inserted while being insulated from the ring by any suitable insulating means as for instance sleeve 7. The ring 4 is suitably connected to the frame of the machine by means of supports or the like 5 disposed at suitable distances from each other. As by means of the arrangement described the ends of the bars projecting outside the active iron are rigidly clasped in the said support ring 4 and the bars at the same time are rigidly secured in the slots of the active iron, the said projecting ends obtain an increased strength against deformations and also to a certain degree stay up the end connectors. The latter may furthermore be stayed up by means of the usual winding supports, if desired.

In the modification shown in Fig. 3, slotted segmental supporting plates 6 are used each of which plates support two winding bars. Each of said plates are rigidly connected to the frame of the machine by a support 5 and may be applied to some or all of the bars.

If the bar supports are made of electrically insulating material it is, of course, unnecessary to surround the ends of the bars with an insulation.

Having thus fully described my invention, I claim as new and desire to secure by Letters Patent of the United States:—

1. In a stator for electric alternating current machines, the combination of an iron core, a main bar winding disposed in said iron core, end connectors connecting the ends of said winding bars, and means for rigidly supporting the ends of said winding bars outside the end connectors.

2. In an alternating current machine, the combination of a machine frame, a stator core, a main bar winding disposed in said stator core, end connectors connecting the ends of said winding bars, and a slotted support for staying up the ends of said winding bars outside said end connectors.

3. In a stator for electric alternating current machines, the combination of an iron core, a main bar winding disposed in said iron core, end connectors connecting the ends of said winding bars, and a slotted supporting ring rigidly connected to the ends of the winding bars outside the end connectors.

4. In a stator for alternating current machines, the combination with the stator casing and stator core, a main bar winding disposed in said core, and end connectors connecting the ends of the bars of said winding; of a seating element provided with perforations in which the ends of said bars that project beyond the connectors are seated, and means to support said element from the casing, whereby movement of said bars due to electrodynamic forces is prevented.

5. In a stator for alternating current machines, the combination with the stator casing and stator core, bars of a main winding, and end connectors for said bars; of a perforated supporting ring into the perforations of which the ends of said bars projecting beyond the connectors are seated, and radially arranged brackets between said ring and casing whereby movements due to electrodynamic forces in said bars are counteracted.

In testimony that I claim the foregoing as my invention, I have signed my name in presence of two subscribing witnesses.

CARL G. SILVANDER.

Witnesses:
NILS SMITH,
DANIEL BJÖRK.

Copies of this patent may be obtained for five cents each, by addressing the "Commissioner of Patents, Washington, D. C."